United States Patent

Leroux

Patent Number: 5,167,909
Date of Patent: Dec. 1, 1992

[54] LOWER CONNECTOR OF A FUEL ASSEMBLY OF A NUCLEAR REACTOR COOLED BY LIGHT WATER

[75] Inventor: Jean-Claude Leroux, Villeurbanne, France

[73] Assignees: Framatome; Cogema, both of France

[21] Appl. No.: 631,161

[22] Filed: Dec. 20, 1990

[30] Foreign Application Priority Data

Dec. 21, 1989 [FR] France .................. 89 16996

[51] Int. Cl.$^5$ .............................................. G21C 9/00
[52] U.S. Cl. ..................................... 376/352; 376/280; 376/451
[58] Field of Search ............... 376/438, 448, 352, 280, 376/364, 451

[56] References Cited

U.S. PATENT DOCUMENTS 4,053,358 10/1977 Pennell ............................ 376/280
4,192,716 3/1980 Anthony ......................... 376/364

Primary Examiner—Brooks H. Hunt
Assistant Examiner—Meena Chelliah
Attorney, Agent, or Firm—Pollock, Vande Sande & Priddy

[57] ABSTRACT

The lower connector (10) comprises a transverse element (12) having a box-shaped structure. The transverse element (12) comprises a reticular structure (13) resistant to bending and limited externally by a frame (14), the cross-section of which corresponds substantially to the cross-section of the assembly. The structure (13) has large-size cells. The transverse element comprises, furthermore, a retaining plate (20) pierced with small-size orifices and superposed on and fastened to the recticular structure (13) parallel to the latter and with a spacing (b), to form the upper part of the connector (10) and delimit a free space for steadying the cooling water of the reactor and for recovering debris carried along by the water, forming the hollow central part of the box-shaped structure.

6 Claims, 4 Drawing Sheets

FIG_1

LOWER CONNECTOR OF A FUEL ASSEMBLY OF A NUCLEAR REACTOR COOLED BY LIGHT WATER

FIELD OF THE INVENTION

The invention relates to a lower connector of a fuel assembly of a nuclear reactor cooled by light water, especially of a pressurized-water nuclear reactor.

BACKGROUND OF THE INVENTION

Pressurized-water nuclear reactors comprise a core consisting of prism-shaped assemblies arranged side by side in vertical position. The assemblies comprise a framework consisting of longitudinal guide tubes and spacer grids and closed by connectors in which the fuel rods are arranged.

One of the connectors of the assemblies, called the lower connector, comes to rest on the lower core plate which is pierced with holes in the region of each of the assemblies, to allow the cooling water of the reactor to pass through the core vertically and from the bottom upwards.

This connector comprises supporting feet which come to rest on the lower core plate, and an element transverse relative to the direction of the fuel rods of the bundle fixed to the supporting feet. This transverse element consists of an adapter plate, in which the lower ends of the guide tubes of the assembly are fastened and through which extend orifices allowing the passage and ensuring the distribution of reactor cooling water which circulates in the vertical direction and in contact with the outer surface of the rods of the assembly, after passing through the lower connector.

The adapter plate of the lower connector of a fuel assembly of a water-cooled reactor thus contributes to the rigidity of the framework of the assembly, ensures the absorption of forces exerted on the lower connector and particularly the absorption of the weight of the framework and of the bundle transmitted by the guide tubes and must, furthermore, allow the passage and distribution of the cooling water of the assembly.

The adapter plate is mainly subjected to bending and undergoes high stresses, especially in the vicinity of its upper face and lower face. This plate, produced in one piece, must have a large thickness ensuring that the lower connector has high rigidity.

The adapter plate must also ensure that the fuel rods of the assembly are retained, in the event that some of these rods are no longer held sufficiently effectively by the holding elements of the spacer grids and tend to slide in the axial direction of the bundle under the effect of their own weight.

Insofar as the water passage holes extending through the adapter plate are generally of a diameter larger than the diameter of the fuel rods, it is necessary to provide a network of holes in positions offset relative to the transverse positions of the fuel rods, so that each of the fuel rods is vertically in line with a solid part of the adapter plate.

Even when all or some of the holes passing through the adapter plate have a diameter smaller, even markedly smaller, than that of the fuel rods, it is desirable to avoid placing these holes of small diameter vertically in line with the fuel rods which, in the event of an accidental fall, risk blocking one or more water passages and therefore reducing or locally eliminating the cooling of the fuel rods by water circulation.

Moreover, in view of the thickness of the adapter plate, it is necessary to provide water passage holes which are such that the head loss of the cooling water through the lower connector is as small as possible.

It is extremely difficult to design an adapter plate which can satisfy the various mechanical and hydraulic requirements mentioned above.

The machining of this adapter plate is an extremely difficult operation requiring high accuracy of execution.

Furthermore, debris particles may be present in the primary circuit of the reactor and are liable to be carried along by the circulating pressurized water. If they are of a small size (for example, smaller than 10 mm), they can pass through the adapter plate of the lower connector, the water passage holes of which have a diameter generally larger than 10 mm. Such debris may become jammed between the fuel rods and the elements holding the rods in the region of the first grid, i.e., the spacer grid holding the rods according to a regular network and being the lowest in the assembly. This debris subjected to the axial and transverse hydraulic stresses which are high in this zone, can wear the sheathing of the fuel rod. This risks a loss of sealing of this sheathing and an increase in the rate of activity of the primary circuit of the reactor.

To prevent this debris from being carried along inside the assembly, it has been proposed to carry out filtration of the cooling fluid in the region of the adapter plate of the lower connector by providing holes which pass through this adapter plate, and the diameter of which is sufficiently small to stop the debris liable to be jammed in the first grid of the assembly.

However, to ensure that the flow of cooling fluid passes through the adapter plate with only moderate head loss, it is necessary to provide a very dense network of passage holes, thus further complicating the machining of the adapter plate.

The lower connectors of the fuel assemblies can be produced in one piece by the machining of a molded part or, on the contrary, from a plurality of molded and machined parts which are joined together by welding. In this case, it can be especially advantageous to carry out the welding by electron beam.

The connectors of the assembly consist, for example, of a reticular structure limited externally by a frame, the cross-section of which corresponds substantially to the cross-section of the assembly, and having walls connected to one another and to the frame, delimiting large-size cells introducing only a negligible head loss into the circulation of the cooling water of the reactor. A plate of small thickness which can be die-stamped is attached and secured removably to one of the faces of the reticular structure. To regulate the flow of the cooling water through the connector, the plate is pierced with orifices, the shape, dimensions and arrangement of which make it possible to set the head loss and distribution of the water passing through the connector.

Such connectors are mainly used as upper connectors of the assemblies and are unsuitable for use as lower connectors in which they must ensure both the retention of the rods and the distribution and adjustment of the flow of cooling water entering the assembly. Moreover, these connectors do not ensure that debris transported by the reactor cooling water is stopped and retained.

These processes for producing lower connectors of fuel assemblies from attached parts therefore make it impossible to provide a completely satisfactory solution to the problems regarding the mechanical stability and hydraulic behavior of the adapter plates and the possibility of stopping and retaining the debris transported by the cooling water.

SUMMARY OF THE INVENTION

The object of the invention, therefore, is to provide a lower connector of a fuel assembly of a nuclear reactor cooled by light water, consisting of a framework comprising longitudinal guide tubes, spacer grids and end connectors, and a bundle of parallel fuel rods held in the framework by holding elements in the region of the spacer grids, one of the connectors, or lower connector, intended to come to rest on a support plate of the core of the reactor comprising a transverse element for the absorption of force and for retaining the fuel rods, comprising a reticular structure resistant to bending and limited externally by a frame, the cross-section of which corresponds substantially to the cross-section of the assembly, and having walls delimiting large-size cells; this lower connector possessing, furthermore, properties of optimized mechanical resistance and hydraulic behavior and capable of being produced in a simple way by means of conventional machining operations, while at the same time allowing debris circulating in the cooling water of the reactor to be stopped.

To this end, the transverse element is in the form of a box comprising a retaining plate of small thickness in relation to the reticular structure and pierced with a regular network of orifices, the dimension of which is smaller than the maximum dimension of the spaces reserved between the rods and the elements holding these rods in the spacer grids, and superposed on and fastened to the reticular structure in an arrangement parallel to the faces of this structure and with a particular spacing of the same order of magnitude as the thickness of the reticular structure, so as to provide within the box, between the reticular structure and the anti-debris retaining plate, a free space for steadying the flow of the cooling water of the reactor and for recovering the debris.

BRIEF DESCRIPTION OF THE DRAWINGS

To facilitate understanding of the invention, several embodiments of a lower connector according to the invention for a fuel assembly of a pressurized-water nuclear reactor will now be described by way of example with reference to the accompanying drawings.

DESCRIPTION OF PREFERRED EMBODIMENT

Figure 1:
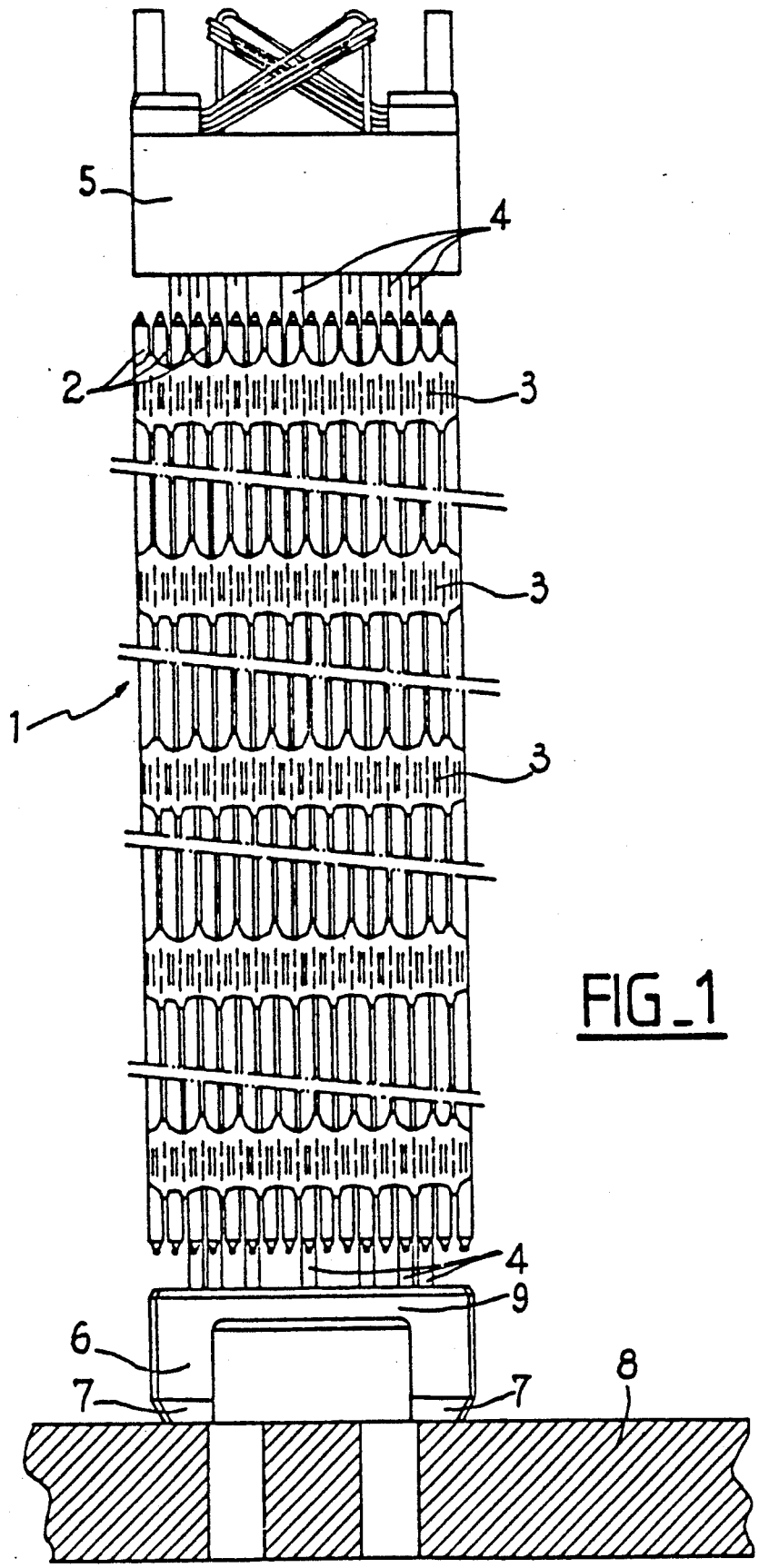
FIG. 1 is an elevation view of a fuel assembly of a pressurized-water nuclear reactor.

FIG. 1 shows a fuel assembly designated as a 1 consisting of a bundle of parallel fuel rods 2 held in a framework consisting of longitudinally directed guide tubes 4, transverse spacers 3 and end connectors 5 and 6. The spacers 3 consist of grids, the cells of which each receive a fuel rod. Some positions of the network of grids are occupied by guide tubes 4, the length of which is greater than the length of the fuel rods 2. Each of the guide tubes 4 is fastened to the set of spacer grids which are spaced uniformly over the length of the assembly.

Furthermore, the guide tubes are connected, at one of their ends, to a connector 5 forming the upper connector of the assembly and, at their other end, to a second connector 6 forming the lower connector.

In its operating position, the assembly is arranged vertically, as shown in FIG. 1, the lower connector 6 resting by means of feet 7 on the upper surface of the lower core plate 8 of the nuclear reactor.

The plate 8 is pierced with four water passage holes opening out, below the corresponding lower connector 6, in the region of each of the fuel assemblies forming the core of the reactor.

The supporting feet 7 are fixed, in their upper part, to a transverse supporting element 9, to which the lower ends of the guide tubes 4 are fastened.

The cooling water of the reactor passing through the lower core plate 8 via the orifices opening out under the connector 6 passes through the transverse element 9 which is pierced with a network of orifices over its entire thickness.

The cooling water is thus made to circulate in the vertical direction and from the bottom upwards in contact with the fuel rods 2 which it cools.

In the arrangements according to the prior art, the transverse element 9 consists of an adapter plate pierced over its entire thickness with a network of orifices ensuring the passage of the cooling water or of a reticular structure, to which is attached and secured removably a plate having orifices intended for directing and adjusting the flow of the cooling water entering the assembly.

Figure 2:
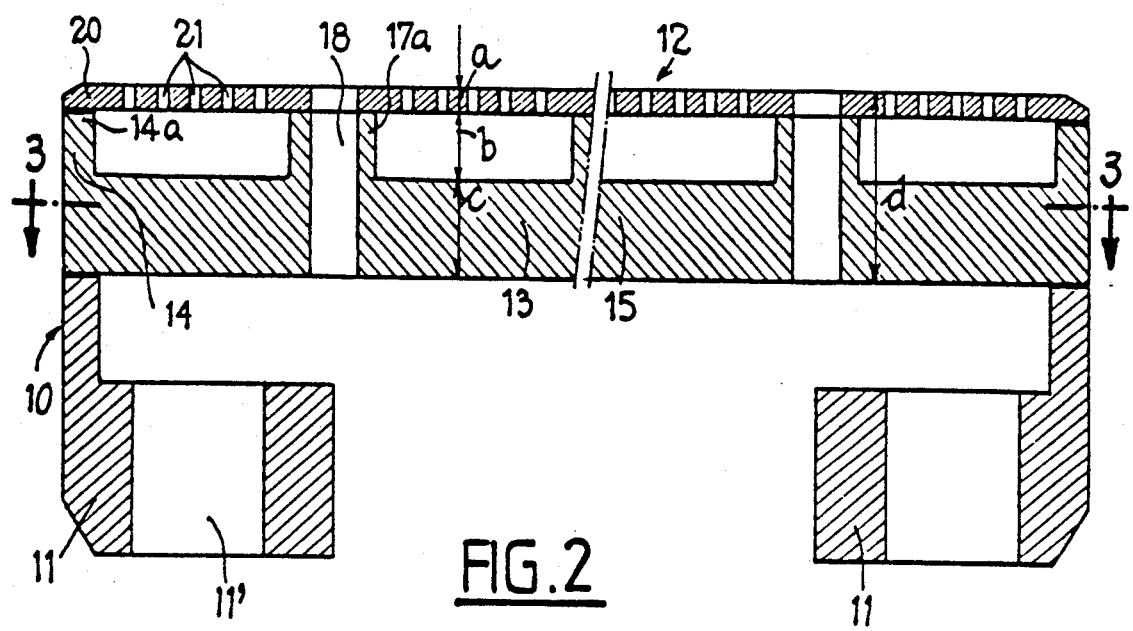
FIG. 2 is a sectional view of the lower connector of the assembly along line 2—2 of FIG. 3.

FIG. 2 illustrates a lower connector of a fuel assembly according to the invention, designated as a whole by the reference 10.

The connector 10 comprises supporting feet 11 similar to the supporting feet 7 of the assembly shown in FIG. 1 and intended to come to rest on the lower core plate of the nuclear reactor, in which is loaded the fuel assembly having the lower connector 10.

The supporting feet 11 are fixed, in their upper part, to a transverse element 12 similar to the element 9 shown in FIG. 1 and capable of performing the functions of absorbing force and holding the fuel rods of the assembly which are conventionally carried out by an adapter plate.

The element 12 is a unit of the "sandwich" type combining components superposed and joined rigidly to one another and forming a box structure having a hollow inner part.

Figure 3:
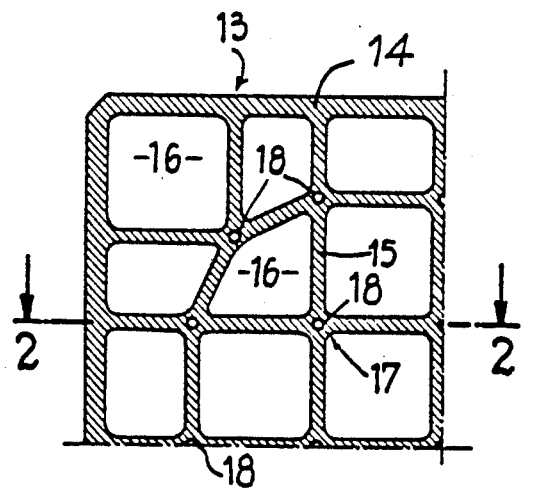
FIG. 3 is a partial sectional view in a horizontal plane according to 3—3 of FIG. 2.

A first component of the element 12 arranged in its lower part consists of a reticular structure 13, of which part of the cross-section taken in a horizontal plane is shown in FIG. 3.

The reticular structure 13 comprises an outer frame 14 of parallelepipedic shape, the square cross-section of which corresponds substantially to the cross-section of the fuel assembly.

Where a fuel assembly for a pressurized-water nuclear reactor is concerned, according to the current design each frame 14 has a square cross-section, the side measures about 20 cm. The thickness of the wall of the frame 14 is of the order of 10 mm or a little more.

The supporting feet 11 are welded to the lower face of the structure 13 at each of its corners. Two of the supporting feet 11 have orifices 11' which engage onto positioning studs fixed to the upper surface of the lower core plate of the reactor when the assembly is installed.

The reticular structure 13 comprises inner walls 15 integral with the frame 14 and delimiting cells 16 in the form of quadrilaterals with rounded corners. Most of these quadrilaterals consist of squares arranged in rows parallel to the sides of the frame 14.

FIG. 3 shows part of the reticular structure corresponding substantially to a quarter of the plane cross-section of this structure.

The walls 15 of the cells, the thickness of which is substantially equal to 10 mm, intersect to form junction nodes 17, in the region of which the metal of the structure 13 has some extra thickness in relation to the walls 15. At each of the nodes 17, the reticular structure 13 is pierced over its entire thickness with a hole 18 allowing the lower end of a guide tube of the assembly to be fastened.

To preserve the conventional arrangement of the guide tubes of a fuel assembly for a pressurized-water nuclear reactor, it is expedient locally to use shapes of cells 16 substantially different from the square shape.

The cross-section of the cells 16 in the form of quadrilaterals, as shown in FIG. 3, is large; the cross-section of the cells of smaller size corresponds at least to the cross-section occupied in the assembly by ten or more fuel rods. The reticular structure 13 therefore causes only a slight head loss in the circulation of the cooling water and modifies this circulation only little.

As can be seen in FIG. 2, the outer edge 14a of the frame 14 is raised in relation to the upper face of the inner part of the reticular structure 13. Moreover, at each of the nodes 17, around the corresponding orifice 18 for the engagement of a guide tube, the reticular structure 13 is likewise raised by a part 17a projecting relative to the upper face of the reticular structure.

The raised edge 14a and the various projecting parts 17a of the reticular structure 13 at the nodes 17 have upper ends arranged in the same plane at a height b above the upper face of the reticular structure 13, and this height b can have the order of magnitude of the height of the walls of the cells of the reticular structure.

The lower connector 10 according to the invention comprises a retaining plate 20 superposed on the reticular structure 13 and fastened by welding to the upper surface of the edge 14a of the frame 14 and to the projecting parts 17a. Thus, the plate 20, of which the square shape and dimensions are similar to those of the cross-section of the reticular structure 13, is exactly superposed on this reticular structure 13, with which it forms a box, the hollow inner part of which has a height b and is delimited by the upper face of the reticular structure 13 on the one hand and by the retaining plate 20 on the other hand.

The thickness a of the retaining plate 20 is substantially smaller than the thickness c of the reticular structure, and the thickness a can, for example, be five to ten times smaller than the thickness c.

The retaining plate 20 is pierced with orifices 21, the diameter of which is substantially smaller than the diameter of a fuel rod. This diameter, which may, for example, be of the order of 5 mm, is smaller than the maximum dimension of the spaces present between the holding elements and the fuel rods in the region of the spacer grids. The orifices 21 are arranged according to a dense regular network, and there is therefore no disadvantage in terms of the production and use of the connector, insofar as the thickness a of the retaining plate 20 is much smaller than the thickness of an adapter plate of a connector according to the prior art.

The dimension and arrangement of the orifices 21 passing through the retaining plate 20 are determined so as to ensure that the fuel rods are held in the assembly under all circumstances and to prevent an appreciable reduction in the flow of cooling fluid passing through the assembly in the event of the fall of a fuel rod. Furthermore, the debris possibly transported by the cooling water of the reactor and being of such a size that it risks being jammed in the interstices between the fuel rods and the holding elements in the region of the first spacer grid is stopped by the retaining plate 20.

The thicknesses a and c of the retaining plate and of the reticular structure, respectively, the spacing b between these elements and the total thickness d of the transverse element 12 are determined so as to obtain a very high mechanical stability of the element 12 under the loads exerted on it, while at the same time limiting the head loss of the cooling fluid passing through the element 12 to a low level. The hollow inner part of the box-shaped structure of the element 12 forms a space for steadying the cooling water entering the assembly via its lower connector and for trapping the debris transported by this water.

The element 12 mainly undergoes a bending force which is largely supported by the reticular structure 13, the height and rigidity of which can be considerable. The reticular structure 13 comprising large-size cells 16 introduces only a slight head loss into the circulation of the cooling fluid.

Moreover, the retaining plate 20 has a small thickness and a dense regular network of small-size orifices, with the result that the head loss caused by the retaining plate 20 is likewise small and the distribution of the pressure of the cooling water uniform over the cross-section of the assembly.

This retaining plate is therefore quite different from a plate for distributing and adjusting the pressure drop through an assembly connector, known from the prior art, and makes it possible to stop the debris possibly transported by the cooling water of the reactor. Furthermore, it delimits the inner space of the connector, in which the hydraulic conditions of the cooling water are regulated.

The reticular structure 13 can be obtained by the casting and machining of a one-piece part or by joining together sheets of desired thickness by welding.

The edge 14a and the projections 17a can be produced integrally with the structure 13 and obtained by the machining of this structure or attached to its upper part.

The retaining plate 20 consists of a simple plate or strip pierced with a regular network of orifices.

The various component parts of the connector can be joined together by any welding technique, especially by electron-beam welding.

Figure 4:
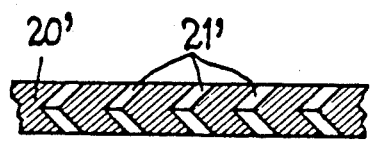
FIG. 4 is a partially sectional view of an alternative embodiment of the retaining plate of a lower connector according to the invention.

FIG. 4 illustrates an alternative embodiment of the retaining plate of a lower connector according to the invention. The retaining plate 20' has orifices 21', each consisting of two converging bores forming a particular angle relative to one another and arranged in oblique directions relative to the faces of the plate 20'. The holes 21' thus have the form of a V in the cross-section of the plate 20'.

Thus, the plate 20' ensures effective retention of the fuel rods, even if the diameter of the bores is equal to or larger than the diameter of the fuel rods.

In some cases, these orifices of angular shape allow the head loss to be limited and make more uniform the distribution of the pressure of the cooling fluid passing through the lower connector.

Figure 5:
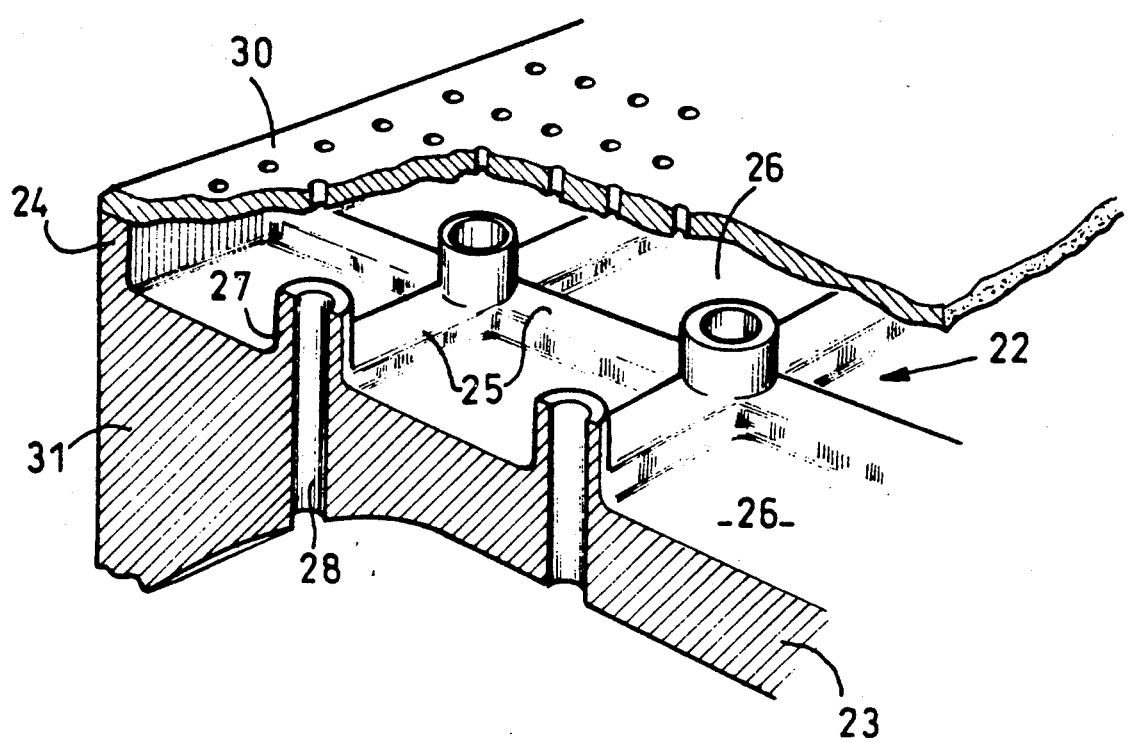
FIG. 5 is a partial perspective view of a connector according to the invention, the reticular structure of which is produced by molding.

FIG. 5 shows part of the transverse force-absorbing element 22 of a lower connector according to the invention consisting of a reticular structure 23 and of a debris-retaining plate 30 attached to the structure 23.

The reticular structure 23, which has a general shape identical to that of the reticular structure 13 illustrated in FIGS. 2 and 3, is produced in one piece by the molding of alloyed steel or nickel alloy. A precision-molding process is preferably used, in order to limit the machining operations to be carried out on the molded part as far as possible.

The steel or alloy, the molding of which is carried out, will preferably have one of the following compositions:

Steel A286 (ASTM A638) : C<0.08, Ni 24 to 27, Cr 13.5 to 16, Mo 1.00 to 1.50, Ti 1.90 to 2.35, Al<0.35, U 0.10 to 0.5, Mn <2.00, Si <1.00, the rest consisting of iron.

Steel NFA32-0.56 (Z2CN18-10M) : C<0.03, Si<1.20, Mo <1.50, Cr 17 to 20, Ni 8 to 12.

Inconel 718.

The reticular structure 23 comprises a frame 24 of square shape and walls 25 delimiting, within the frame 24, cells 26 of large size in relation to the cross-section of the rods of the assembly.

The walls 25 intersect to form function nodes 27 projecting relative to the upper surface of the walls 25.

At each of the nodes 27, the reticular structure 23 is pierced with a hole 28 making it possible to fasten the lower end of a guide tube of the assembly.

The retaining plate 30 is fastened to the upper part of the frame 24 and to the nodes 27 of the structure 23.

The overall structure of the transverse element of an assembly, as shown in FIG. 5, is substantially identical to the structure 13 illustrated in FIGS. 2 and 3. However, as can be seen in FIG. 5 and in FIG. 6, the molding structure 23 comprises reinforcements 31, 31' along its sides, joining the walls 25 and the frame 24 and making it possible to increase the mechanical resistance of the connector. These reinforcements can be of greater or lesser size, depending on the conditions of use of the connector.

Figure 6:
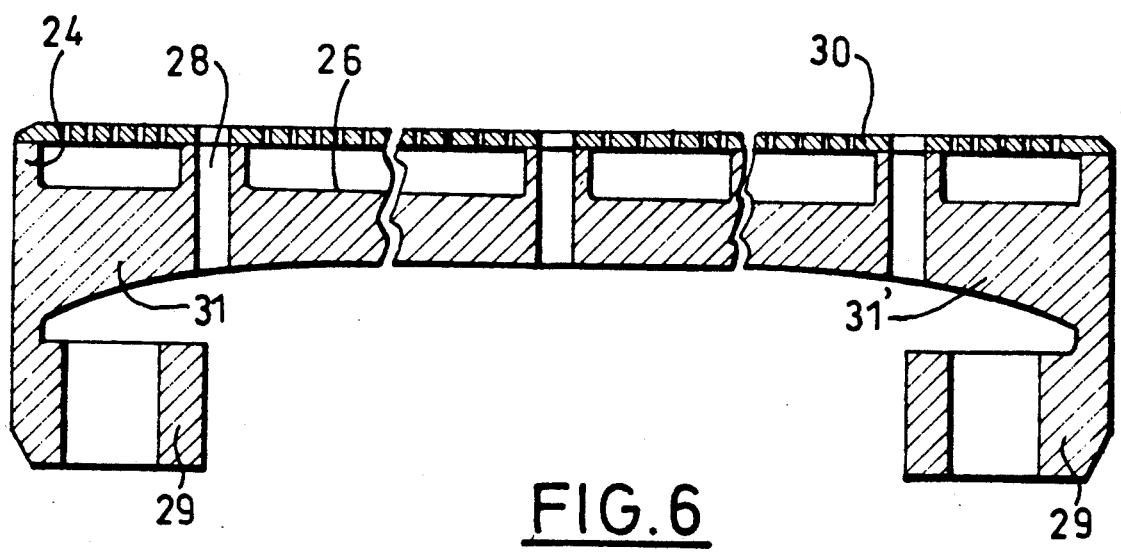
FIG. 6 is a sectional view, similar to FIG. 2, of a connector according to the invention having a reticular structure obtained by molding.

As can be seen in FIG. 6, the feet 29 of the assembly can be produced by molding in one piece with the structure 23.

The feet 29 can also be attached to the structure 23 and fastened by welding.

At all events, the operations of machining the connector are reduced considerably by producing the reticular structure by molding rather than by mechanical welding.

The fuel assembly can rest directly on the core support plate without the use of supporting feet, thus simplifying the construction of the lower connector.

It should be noted that, insofar as the transverse element mainly undergoes bending forces, the central part or core of this element undergoes only low or zero stresses and can be largely recessed, without appreciably increasing the stresses in the other parts of the transverse element. The spacing b corresponding to the height of the hollow part of the box-shaped structure can therefore be wide.

The invention is used for the lower connectors of the fuel assemblies of any nuclear reactor cooled by light water.

I claim:

1. In a fuel assembly of a nuclear reactor cooled by light water, consisting of a framework comprising longitudinal guide tubes, transverse spacer grids and end connectors, and a bundle of parallel fuel rods held in the framework by holding elements in the region of the spacer grids, a lower connector, intended to come to rest on a support plate of the core of the reactor having a transverse element for the absorption of force and for retaining the fuel rods, said lower connector comprising a reticular structure resistant to bending and limited externally by a frame, said reticular structure having a cross-section corresponding substantially to a cross-section of said fuel assembly, and having walls delimiting large-size cells and projecting parts which project relative to said large-size cells in an extension of said walls, a retaining plate having a thickness less than a thickness of said reticular structure and being pierced by a regular network of orifices, said orifices having a dimension which is smaller than a maximum dimension of spaces between said fuel rods and said elements holding said fuel rods in said spacer grids, said retaining plate being superposed on and welded to said reticular structure through ends of said projecting parts in an arrangement parallel to faces of said reticular structure and with a spacing (b) determined by said projecting parts, so that said transverse element is in the form of a box and provides, between said reticular structure and said retaining plate, a free space for steadying a flow of cooling water of said reactor and for recovering debris.

2. Lower connector according to claim 1, wherein said retaining plate has passing through it orifices, each consisting of two converging bores arranged angularly relative to one another and pointed in an oblique direction in relation to faces of said retaining plate.

3. Lower connector according to claim 1, wherein said reticular structure is produced in one piece by molding.

4. Lower connector according to claim 3, wherein said reticular structure is produced by molding of an alloyed steel containing less than 0.08% of C, 24 to 27% of Ni, 13.5 to 16% of Cr, 1.00 to 1.50% of Mo, 1.90 to 2.5% of Ti, less than 0.35% of 1 and 0.10 to 0.50% of U.

5. Lower connector according to claim 3, wherein said reticular structure is produced by molding of a steel containing less than 0.03% of C, less than 1.20% of Si, less than 1.50% of Mo 17 to 20% of Cr and 8 to 12% of Ni.

6. Lower connector according to claim 3, wherein said reticular structure is produced by molding of a nickel alloy.

* * * * *